(No Model.)

T. W. SHEPHERD.
HOLDER FOR THERMOMETERS OR OTHER INDICATORS.

No. 398,804. Patented Feb. 26, 1889.

Witnesses.
Fred. S. Greenleaf
Frederick L. Emery

Inventor.
Thomas W. Shepherd
by Crosby & Gregory Attys.

United States Patent Office.

THOMAS WM. SHEPHERD, OF PEABODY, MASSACHUSETTS, ASSIGNOR TO EDGAR W. UPTON AND HENRY G. RICE, OF SAME PLACE, AND HERBERT TORREY, OF HANOVER, MASSACHUSETTS.

HOLDER FOR THERMOMETERS OR OTHER INDICATORS.

SPECIFICATION forming part of Letters Patent No. 398,804, dated February 26, 1889.

Application filed March 29, 1888. Serial No. 268,889. (No model.)

*To all whom it may concern:*

Be it known that I, THOMAS WILLIAM SHEPHERD, of Peabody, county of Essex, State of Massachusetts, have invented an Improvement in Holders for Thermometers and other Indicators, of which the following description, in connection with the accompanying drawings, is a specification, like letters on the drawings representing like parts.

Metallic thermometers as now manufactured are provided with rings, by which they are hung upon a hook fastened to the wall, and others with a rear bracket or leg for maintaining them in upright position when placed upon a table or other object; but in both instances the thermometer is portable and may be easily carried away by malicious persons.

This invention has for its object to provide suitable means for permanently fastening a thermometer or other indicator to the wall of a room or like place to thereby prevent its ready removal.

The invention consists in the combination, with the case of the thermometer or indicator, of a frame adapted to be securely fastened to the wall and means for securing the said case to the said frame.

The frame herein shown consists of a flanged ring or rim secured to the wall, and the case of the thermometer or indicator to be held by it being provided with a spring-controlled locking device, which, when the case is placed in position in the frame, enters beneath the flange thereof, effectually preventing the removal of the thermometer.

Figure 1:
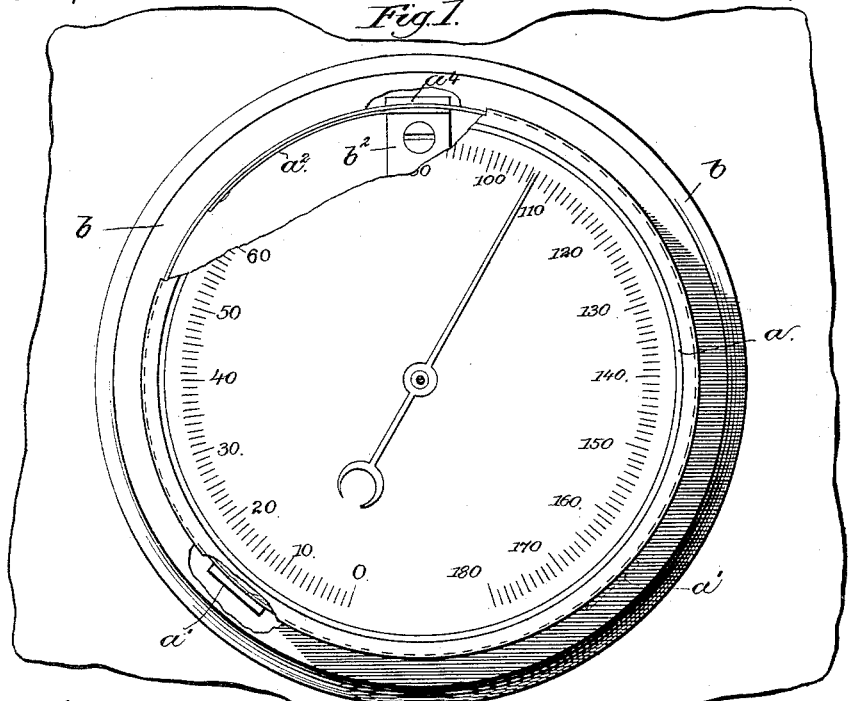
Figure 2:
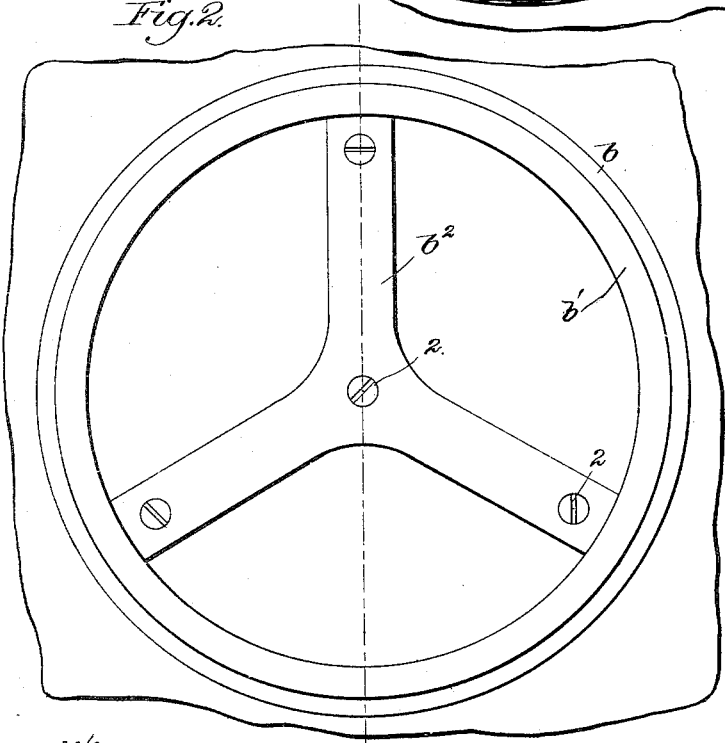
Figure 3:
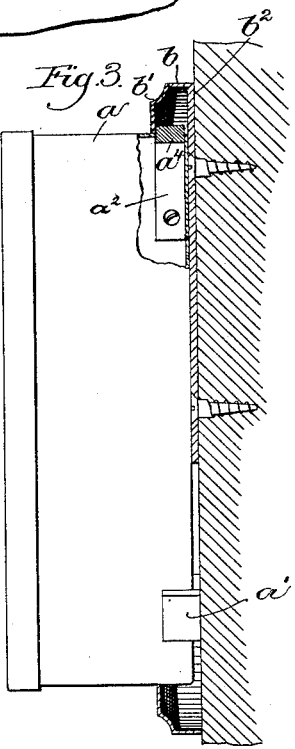

Figure 1 shows in front elevation a thermometer attached to the wall in accordance with this invention, it being broken out to show the locking devices; Fig. 2, a front elevation of a flanged frame to be described; and Fig. 3 a side elevation of the thermometer or indicator shown in Fig. 1, it being broken out to show the locking devices.

The side wall of the case of the thermometer or indicator $a$, of usual construction, has attached to its exterior at somewhat distant, but not diametrically-opposite, points two lugs, $a'$, while the portion of the case opposite thereto has attached to it, upon the inside, a spring, $a^2$, provided at its outer or free end with a block or lug, $a^4$. The spring $a^2$ is attached to the inside of the case, and the block $a^4$ normally passes through an opening in and projects beyond the periphery of the case. The holding frame or rim $b$, provided with a continuous flange, $b'$, is attached to or cast integral with a spider, $b^2$, secured to a wall by screws 2, passing through the arms of the spider, to thereby rigidly secure it in place, the opening within the flange being substantially the same size as the periphery of the side wall of the case $a$.

When the case $a$ is placed in the flanged frame $b$, the lugs $a'$, a less distance apart than the diameter of the case, readily enter beneath the flange $b'$, and when the case is pressed down into position the side wall enters the opening surrounded by the flange and the yielding or spring-controlled block $a^4$ is first pressed within the side wall by the flange, and after passing beyond it springs beneath and engages the flange $b'$, thereby preventing the removal of the case from the rim of the holder. As the flange is continuous, the case may be rotated within the holder or frame, but cannot be removed therefrom by so doing.

To remove the thermometer or indicator from its holder, the face and parts of the thermometer or indicator must first be removed, in order to release the case, as the yielding block is controlled only from the inside of the case; also, it will be seen that the flanged frame $b$ is attached by means which are concealed when the case $a$ is locked in position, so that it would be difficult to remove the case of the thermometer or indicator when once placed in position.

The invention herein shown is also applicable to clocks, barometers, and the like indicators having a dial and pointer, and so I do not desire to limit the same to thermometers only. It is also obvious that other articles, as small show-cases and the like, of any suitable shape may be attached by the holder herein described.

I claim—

1. The case $a$, combined with the frame having a continuous flanged rim or frame adapted to receive the side wall of the case and locking devices concealed and protected by said flange, substantially as described, for permanently locking the case in position.

2. The case $a$ and the flanged frame or rim $b$, combined with an automatic locking device concealed within the said case, and by which the said case is locked to the rim permanently, substantially as described.

3. The case having rigid and yielding locking devices concealed within it, combined with a frame or rim having a continuous flange adapted to be engaged and permanently secured by fastenings concealed by the said flange when placed in the frame, substantially as described.

4. The case having the lugs $a'$ and a yielding locking device, $a^4$, combined with the continuous flanged rim $b$, to which it is attached, and by which the lugs and yielding device are concealed and protected, substantially as described.

5. The case, the flanged rim $b$, having the spider $b^2$ within it, and concealed locking devices to connect the case and rim or holder permanently, substantially as described.

In testimony whereof I have signed my name to this specification in the presence of two subscribing witnesses.

THOMAS WM. SHEPHERD.

Witnesses:
 CHAS. E HOAG,
 BENJ. G. HALL.